(12) United States Patent
Papaxenopoulos et al.

(10) Patent No.: US 11,042,645 B2
(45) Date of Patent: *Jun. 22, 2021

(54) AUTO-REMEDIATION WORKFLOW FOR COMPUTER SECURITY TESTING UTILIZING PRE-EXISTING SECURITY CONTROLS

(71) Applicant: NTT SECURITY APPSEC SOLUTIONS INC., Santa Clara, CA (US)

(72) Inventors: Harry Papaxenopoulos, Riverhead, NY (US); Eric Sheridan, Greensboro, NC (US)

(73) Assignee: NTT SECURITY APPSEC SOLUTIONS INC., Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/049,683

(22) Filed: Jul. 30, 2018

(65) Prior Publication Data

US 2018/0336356 A1    Nov. 22, 2018

Related U.S. Application Data (63) Continuation-in-part of application No. 14/656,490, filed on Mar. 12, 2015, now Pat. No. 10,282,550.

(51) Int. Cl.
| | |
|---|---|
| G06F 21/00 | (2013.01) |
| G06F 21/57 | (2013.01) |
| G06F 8/65 | (2018.01) |
| G06F 21/56 | (2013.01) |

(52) U.S. Cl.
CPC ............. *G06F 21/577* (2013.01); *G06F 8/65* (2013.01); *G06F 21/563* (2013.01); *G06F 21/57* (2013.01); *G06F 2221/033* (2013.01)

(58) Field of Classification Search
None
See application file for complete search history.

(56) References Cited

U.S. PATENT DOCUMENTS

| | | | | |
|---|---|---|---|---|
| 7,302,707 | B1 * | 11/2007 | Weber ................. | G06F 21/577 705/51 |
| 7,392,545 | B1 * | 6/2008 | Weber ................. | G06F 21/577 705/51 |
| 7,908,660 | B2 * | 3/2011 | Bahl ................... | G06F 21/577 726/25 |
| 8,065,712 | B1 * | 11/2011 | Cheng ................. | H04L 63/105 726/1 |

(Continued)

*Primary Examiner* — Maung T Lwin
(74) *Attorney, Agent, or Firm* — Polsinelli PC (57) ABSTRACT

Techniques for performing auto-remediation on computer system vulnerabilities in source code utilizing local repositories are disclosed herein. An application source code representation is scanned to determine any security vulnerabilities and from those vulnerabilities, a set of security patch rules are generated that may be used to automatically remediate the vulnerabilities. One or more of the security patch rules is selected for verification and, once verified may be used to generate a security patch. The security patch may then be automatically applied to the source code representation to produce a patched representation of the application source code with the vulnerability at least partly remediated.

20 Claims, 7 Drawing Sheets

(56) References Cited

U.S. PATENT DOCUMENTS

| | | | |
|---|---|---|---|
| 8,127,353 B2* | 2/2012 | Rittermann | G06F 21/552 |
| | | | 726/22 |
| 8,776,239 B2 | 7/2014 | De Keukelaere et al. | |
| 8,800,042 B2 | 8/2014 | Sima et al. | |
| 8,832,828 B2 | 9/2014 | Lyne et al. | |
| 8,966,635 B2 | 2/2015 | Dewey | |
| 9,009,832 B2 | 4/2015 | Be'ery et al. | |
| 9,117,069 B2* | 8/2015 | Oliphant | H04L 63/20 |
| 2003/0135749 A1 | 7/2003 | Gales et al. | |
| 2006/0282897 A1 | 12/2006 | Sima et al. | |
| 2007/0083933 A1 | 4/2007 | Venkatapathy et al. | |
| 2007/0143851 A1* | 6/2007 | Nicodemus | G06F 11/3495 |
| | | | 726/25 |
| 2007/0150951 A1* | 6/2007 | Aaron | H04L 63/1433 |
| | | | 726/22 |
| 2007/0234304 A1 | 10/2007 | Berg et al. | |
| 2008/0209563 A1* | 8/2008 | Rogers | G06F 21/52 |
| | | | 726/25 |
| 2009/0113550 A1 | 4/2009 | Costa et al. | |
| 2009/0178031 A1 | 7/2009 | Zhao | |
| 2009/0282457 A1 | 11/2009 | Govindavajhala | |
| 2010/0106705 A1 | 4/2010 | Rush et al. | |
| 2010/0248707 A1 | 9/2010 | Hoffner et al. | |
| 2010/0299741 A1* | 11/2010 | Harrison | H04L 63/0281 |
| | | | 726/12 |
| 2011/0231936 A1 | 9/2011 | Williams et al. | |
| 2011/0302566 A1 | 12/2011 | Abadi et al. | |
| 2012/0011493 A1* | 1/2012 | Singh | G06F 21/577 |
| | | | 717/168 |
| 2012/0042383 A1 | 2/2012 | Greene et al. | |
| 2012/0042384 A1 | 2/2012 | Badhwar et al. | |
| 2012/0216242 A1* | 8/2012 | Uner | G06F 21/50 |
| | | | 726/1 |
| 2012/0222123 A1 | 8/2012 | Williams et al. | |
| 2012/0260344 A1 | 10/2012 | Maor et al. | |
| 2013/0019314 A1 | 1/2013 | Ji et al. | |
| 2013/0086689 A1 | 4/2013 | Laverdière-Papineau | |
| 2013/0133075 A1 | 5/2013 | Abadi et al. | |
| 2013/0160131 A1 | 6/2013 | Madou et al. | |
| 2013/0167241 A1 | 6/2013 | Siman | |
| 2013/0198848 A1* | 8/2013 | Wolff | G06F 21/568 |
| | | | 726/25 |
| 2013/0227693 A1 | 8/2013 | Dewey | |
| 2013/0340076 A1 | 12/2013 | Cecchetti et al. | |
| 2014/0165204 A1 | 6/2014 | Williams et al. | |
| 2014/0237599 A1* | 8/2014 | Gertner | H04L 63/1441 |
| | | | 726/24 |
| 2014/0282872 A1 | 9/2014 | Hansen et al. | |
| 2014/0283069 A1 | 9/2014 | Call et al. | |
| 2014/0317740 A1 | 10/2014 | Be'ery et al. | |
| 2014/0331327 A1 | 11/2014 | Maor et al. | |
| 2014/0359588 A1 | 12/2014 | O'Boyle et al. | |
| 2014/0359776 A1 | 12/2014 | Liu | |
| 2015/0013011 A1 | 1/2015 | Brucker et al. | |
| 2015/0033352 A1* | 1/2015 | Oliphant | G06F 21/50 |
| | | | 726/25 |
| 2015/0106939 A1 | 4/2015 | Lietz et al. | |
| 2015/0207811 A1 | 7/2015 | Feher et al. | |
| 2015/0213272 A1 | 7/2015 | Shezaf et al. | |
| 2015/0227746 A1 | 8/2015 | Chen et al. | |
| 2015/0269380 A1* | 9/2015 | Golovanov | G06F 21/562 |
| | | | 726/24 |
| 2016/0099953 A1* | 4/2016 | Hebert | H04L 63/1416 |
| | | | 726/23 |

* cited by examiner

AUTO-REMEDIATION WORKFLOW FOR COMPUTER SECURITY TESTING UTILIZING PRE-EXISTING SECURITY CONTROLS

CROSS-REFERENCE TO RELATED APPLICATION

This application is a continuation in part application of U.S. patent application Ser. No. 14/656,490, which is incorporated by reference in its entirety.

TECHNICAL FIELD

The present technology pertains to auto-remediating security vulnerabilities in source code, and more specifically pertains to utilizing pre-existing security controls for auto-remediating security vulnerabilities in source code.

BACKGROUND

Modern computer systems can comprise of a variety of components, some of which are provided by third-parties and some of which are developed in-house. Components developed in-house can receive frequent updates to, for example, add new features or to fix defects. Such updates can introduce security vulnerabilities in the computer system, some of which can be difficult to locate. For example, a source code change to fix a defect in a software component can pass unit tests, regression tests, "black box" tests, and other such tests, but can still introduce security vulnerabilities due to interaction with other components in the system. Maintaining the security of such complex systems can be made more difficult when such components frequently change.

Software testing and, in particular, static code analysis can be used to identify some software vulnerabilities. In static code analysis, a software application is tested without actually executing the application. The software application is typically tested by processing and analyzing the source code of the application. The entire source code of the application, or only portions of the source code, can be analyzed. The source code can be analyzed for one or more of a variety of purposes, such as for identifying possible coding errors, determining properties of the software application, or determining vulnerabilities. However, such analysis can only identify errors and vulnerabilities without performing any steps to remediate such vulnerabilities. Additionally, such analysis can only locate one of a plurality of vulnerabilities, particularly when such vulnerabilities occur at or near a control flow, where a plurality of execution paths can be taken. Such analysis and remediation can become even more complex in source code that makes use of modern programming paradigms such as object-oriented programming, inversion of control, dependency injection, and aspect-oriented programming. Failure to remediate such source code security vulnerabilities can make computer systems less stable, less available, and/or less secure, leading to a degraded experience for users of those systems.

Generally software engineers, maintaining application source code, have a variety of different security controls in their codebases. Applications performing static code analysis and remediation of source code also have a variety of security controls, which while performing similar functions are different codebases than the software engineers.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Various examples of the present technology are discussed in detail below. While specific implementations are discussed, it should be understood that this is done for illustration purposes only. A person skilled in the relevant art will recognize that other components and configurations can be used without parting from the spirit and scope of the present technology.

The disclosed technology addresses the need in the art for automatic and directed remediation (by a security application) of security vulnerabilities in software applications and/or source code. Subsequent to a scan of the software application and/or source code one or more security vulnerabilities can be determined. The one or more security vulnerabilities require remediation to prevent malicious attacks on the software application and/or source code. The remediation process can include security rules created from one or more application programming interfaces (API) accessible by the security application. When remediation utilizes APIs provide by the security application (or other third party), these new APIs (and libraries, classes, etc.) will then need to be monitored, updated, and maintained by the system administrator of the application and/or source code. In some instances, the security application can utilize APIs already utilized in the application and/or source code. APIs can include many classes, libraries, and methods, some of which are actively utilized in the application and/or source code and others which are include and available for use in the APIs, but not currently utilized in the application and/or source. These different classes, libraries, and methods can be utilized (if applicable) to remediate the security vulnerabilities. When utilizing APIs which already have a presence in the application and/or source code the system administrator is relieved of the burden of monitoring, updating, and maintaining new APIs.

Techniques described and suggested herein include methods, systems, and processes for performing auto-remediation on computer system security vulnerabilities in source code. The first step in performing auto-remediation on computer system security vulnerabilities in source code is that the source code and/or a representation of source code can be scanned for security vulnerabilities using static analysis and/or dynamic analysis techniques. In some examples, the scanning of the source code and/or the determination of vulnerabilities can be performed by an external process or preprocess such as, for example, by a process configured to implement static analysis or static application security testing. In some examples, the process configured to implement static analysis or static application security testing can be configured as an analysis service. In some examples, the scanning of the source code and/or the determination of vulnerabilities can be performed by an auto-remediation service as described herein. As a result of this scan, one or more security vulnerabilities and/or the location of those vulnerabilities within the source code and/or representation can be identified.

Vulnerabilities can be, for example, instances in the code where sensitive data can be made available to a malicious attacker or where execution of code can make control of a software system available to unprivileged users. For example, in source code that processes credit card numbers, any clear text (unencrypted) storage of the credit card number can be considered a security vulnerability (also referred to herein simply as a "vulnerability") due to the possibility of making such information available to an attacker.

A next step in performing auto-remediation on computer system security vulnerabilities in source code is that one or more security patch rules can be generated based on the source code and/or representation and/or the vulnerabilities. Security patch rules (also referred to herein simply as "patch rules") are rules for applying security patches to a source code and/or representation based on the one or more system security vulnerabilities. Rules are typically embodied in data structures that can be read and interpreted by a program such as a rules processor. For example, a source code patch processing program might read in source code from memory or other electronic storage, read in a set of rules records from a rules store or rules database, with the source code patch processing program having program instructions on how the rules records that are applied would modify the source code that is read in.

Security patch rules can be generated by selecting one or more patch rules from a patch rules repository. A rules repository might contain records of patch rules (e.g., application programming interfaces, etc.) that are authored and entered by security subject matter experts based on, for example, previous experience, known vulnerabilities, or known computer system conditions. The rules repository might contain some patch rules that are sourced from other than security subject matter experts. In some instances, the rules repository can include records of patch rules provided by the owners or administrators of the source code. In some instances, the rules repository can include records of patch rules provided by the entity or application performing the auto-remediation. In some examples, the security patch rules can be generated, first, by checking the rules repository maintained by the owners or administrators of the source, and then by the entity or application performing the auto-remediation, if required. In some examples, the security patch rules can be generated by determining, for the determined security vulnerabilities, which rules repository contains higher quality patch rules (e.g., between the rules repository maintained by the owners or administrators of the source and rules repository by the entity or application performing the auto-remediation). In some examples, the patch rules can be automatically generated and/or automatically selected based on rules expressing such previous experience, known vulnerabilities, or known computer system conditions. For example, in the above instance with source code that processes unencrypted credit card numbers, a security patch rule can be authored to encrypt the credit card number by a security subject matter expert and stored in a patch rules repository. The rule can be generated by automatically selecting from the patch rules repository by an auto-remediation service based on the detected vulnerability.

A security patch rule (e.g., API, etc.) can include rules for applying a plurality of possible patches (e.g., classes, libraries, etc.) to the source code and/or representation based on the vulnerabilities including, for example, multiple types of encryption to implement, multiple source code modifications, or combinations of these and/or other types of patches to the source code. For example, a security patch rule can include a patch to add encryption calls to the source code and also can include variations of that patch that choose different encryption methodologies. A security patch rule can specify rules for applying security patches in terms of statements generally of the form "if a vulnerability exists at a determined location, apply a selected patch to the source code and/or representation at a location relative to the determined location." Such security patch rules can be specified as name-value pairs, as scripts (e.g., XML, scripts, JSON scripts, or JavaScript), or as some other rules representation.

One or more of the plurality of possible patches in the security patch rule can then be applied to the source code and/or representation to produce one or more at least partially patched source code and/or representations. The at least partially patched source code and/or representations, for example, not be completely patched due to their missing the final specification of additional values (also referred to herein as "optional parameters") indicated in the security patch rule. As an example of such partial patches, a security patch rule to add encryption to a source code representation can specify an encryption method that requires a security key obtained from a security key file located on a computer system that the source code can be executed on. As different implementations can locate the security key file in different locations, the location of the security key file can be left as an additional (i.e., to be specified later) value in the security patch rule. Similarly, the security patch rule can specify an encryption method that obtains a security key from a location specified by an environment variable, the value of which can also be an additional value in the security patch rule. As can be contemplated, the additional values in the security patch rules described herein are merely illustrative example and other such additional values in the security patch rules can be considered as within the scope of the present disclosure.

The one or more at least partially patched source code and/or representations can then be verified by, for example, a security subject matter expert, can have the additional values filled in, also by a security subject matter expert and/or additionally by one or more end users. One of the partially patched source code and/or representations can then be selected for completion, completed (i.e., all additional values specified), and applied to the source code and/or representation. In some examples, one or more steps of the verification, selection, and completion of the security patch rules can be automatically performed by an auto-remediation service as described herein. In some examples, one of more of the steps of the verification, selection, and completion of the security patch rules can be performed by a user such as a security subject matter expert, a system administrator, a customer, or an end user.

The final step in performing auto-remediation on computer system security vulnerabilities in source code is to use the verified, selected, and completed security patch rule to patch the source code and/or representation and to commit the patched source code and/or representation for use in place of the formerly vulnerable code. In some examples, additional testing and/or verification can be applied to the updated code including, but not limited to, unit testing, regression testing, black box testing, static analysis, dynamic analysis, or other such testing methodologies.

Also disclosed are systems, methods and computer-readable mediums for remediating application source code including being configured to receive application source code or a representation of the application source code (where the representation of the application source code can be different than the application source code) and scan the application source code and/or representation (e.g., without executing the application source code) to determine one or more vulnerabilities in the application source code and/or representation. In response to determining one or more vulnerabilities in the application source and/or representation, the systems, methods and computer-readable mediums can determine if a local rules repository exists. In response to the local rules repository existing, the systems, methods and computer-readable mediums can access one or more local rules repositories storing one or more security fix rules (which can include one or more application programming interfaces for use in the application source code) and generate one or more security patch rules (e.g., generated in a review mode) based at least in part on the one or more vulnerabilities and based at least in part on the one or more security fix rules stored at the one or more local rules repositories. The systems, methods and computer-readable mediums can verify a subset of the one or more security patch rules and select at least one of the verified subset of the one or more security patch rules to generate a security patch to remediate the one or more vulnerabilities. The systems, methods and computer-readable mediums can then apply the security patch to the application source code and/or representation.

In some embodiments, in response to the local rules repository (e.g., storing APIs currently utilized within the source code, etc.) not existing, The systems, methods and computer-readable mediums can generate one or more security patch rules based at least in part on the one or more vulnerabilities and based at least in part on the one or more security fix rules stored at a rules repository (e.g., APIs not currently utilized within the source code, etc.).

In some embodiments, the systems, methods and computer-readable mediums can modify the source code and/or generate a modified representation based on the one or more security patch rules.

In some embodiments, the local rules repository includes a plurality of application programming interfaces, libraries and/or classes that are at least partially and/or actively utilized in the source code.

Figure 1:
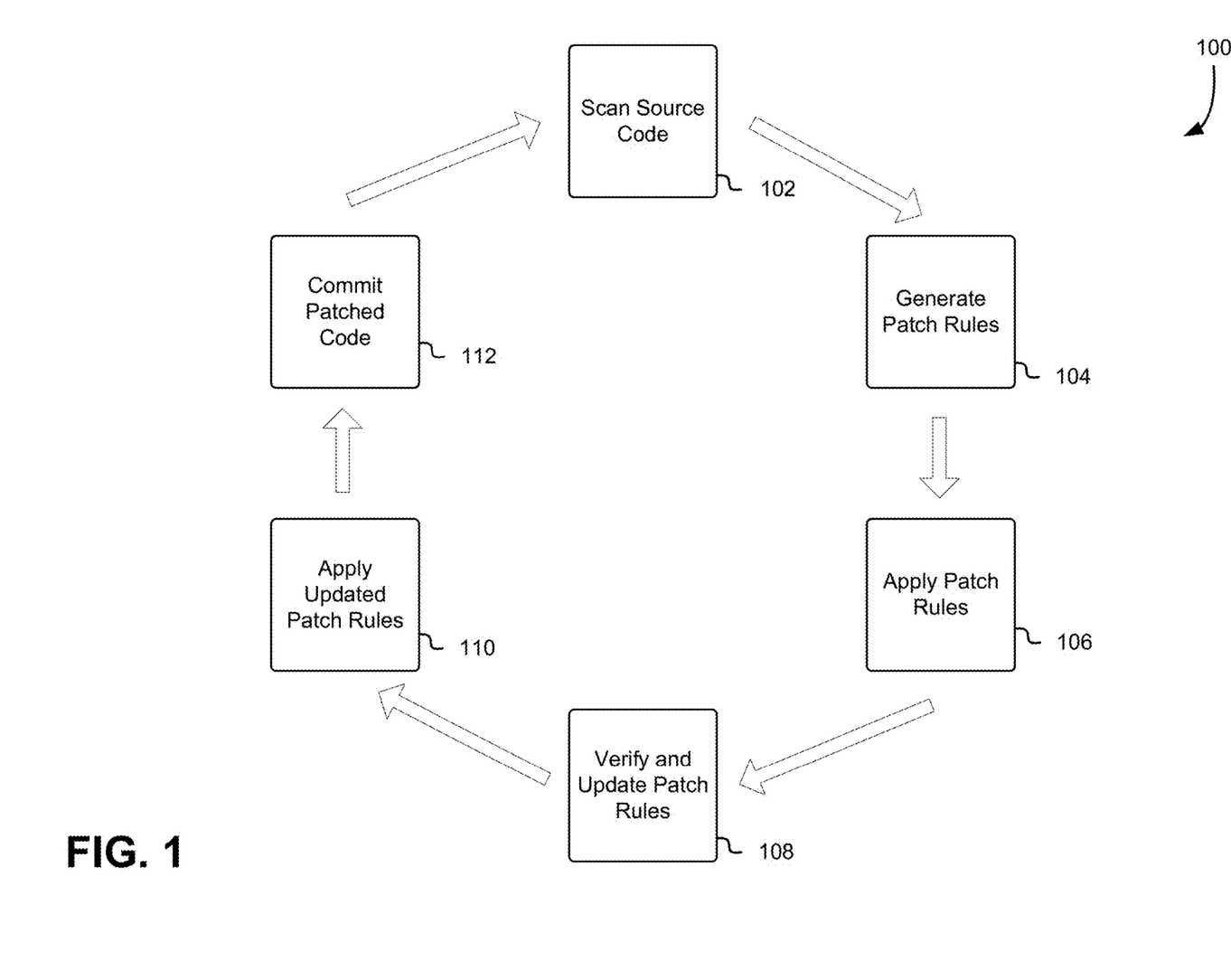
FIG. 1 illustrates an example workflow for performing auto-remediation on computer system security vulnerabilities in source code in accordance with an example.

FIG. 1 illustrates a workflow 100 for performing auto-remediation on computer system security vulnerabilities in source code in accordance with an example. The workflow 100 illustrated in FIG. 1 can be performed by an auto-remediation service and/or by one or more components thereof. At least a portion of the workflow 100 illustrated in FIG. 1 can also be performed by external components associated with the auto-remediation service such as, for example, a static security analysis application. First, a representation of source code can be scanned 102 to, for example, detect security vulnerabilities. The source code representation can be a listing (i.e., the textual representation of a program) of source code that can be compiled to generate machine code such as, for example, code written in BASIC, C, C++, Fortran, Lisp, or other such languages. The source code representation can also be a listing of source code that can be compiled into bytecode such as, for example, code written in C#, Java, or other such languages. The source code representation can also be a listing of source code that can be interpreted such as, for example, code written in Java, JavaScript, Perl, PHP, Python, Ruby, a scripting language (e.g., TCL or Lua), or other such interpreted languages. In some examples, the source code representation can include the machine code generated by a compiler, bytecode generated by an interpreter, or an intermediate representation of the source code such as, for example, an abstract syntax tree, or some other data structure.

As described above, the representation of source code can be scanned for security vulnerabilities using static analysis and/or dynamic analysis techniques. In static analysis (also referred to herein as "static application security testing"), the representation of the source code can be scanned while the source code is not executing, and where branch points are located by the scan with multiple possible outcomes, each possible branch can be analyzed. For example, a source code statement that effectively states "if a variable is less than zero, perform a first set of actions and if not, perform a second set of actions" can be analyzed as if the variable is less than zero as well as if the variable is not less than zero. In dynamic analysis, the representation of the source code can be scanned while the source code is executing. Such analysis only analyzes branches in code that are taken during the dynamic analysis. For example, in the example above, if the variable is never less than zero during the dynamic analysis, the analysis of the first set of actions never be performed.

In some examples, in order to perform auto-remediation on computer system security vulnerabilities in source code using static analysis and/or dynamic analysis, the static and/or dynamic analysis tools can be altered or enhanced to provide additional information (also referred to herein as "additional metadata") to the auto-remediation service. For example, some method of detecting conflicts when merging security patches can be needed such as, for example, by generating file name hashes. Additionally, some consistent method of determining line numbers and/or column numbers (i.e., for the beginning and end columns) of each line can be needed. Another enhancement to static and/or dynamic analysis tools can be enhanced position analysis as described herein. One example of enhanced position analysis can be that the static and/or dynamic analysis tools can determine what portion of a string or input an attacker can control throughout a source code representation in order to determine a best location for applying a security patch. Such enhancements can provide the additional metadata as, for example, part of the vulnerability data as described herein. As can be contemplated, the alterations or enhancements to the static and/or dynamic analysis tools described herein are illustrative examples and other such alterations or enhancements to the static and/or dynamic analysis tools can be considered as within the scope of the present disclosure.

After the representation of the source code is scanned 102 for security vulnerabilities, those security vulnerabilities, combined with the source code representation can be used to generate one or more patch rules 104 which can include a plurality of possible patches that can be applied to the source code representation to address the security vulnerabilities. In some instances, the one or more patch rules can be generated from the rules repository provided by the owners or administrators of the source code. In some instances, the one or more patch rules can be generated from the rules repository provided by the static security analysis application. In an example, the static security analysis application can first query the rules repository of patch rules (e.g., APIs, etc.) provided by the owners or administrators of the source code. In response to one or more patch rules that address the security vulnerabilities being generated from the rules repository provided by the owners or administrators of the source, the static security analysis application can proceed to applying the one or more patch rules 106. In response to not generating one or more patch rules that address the security vulnerabilities from the rules repository provided by the owners or administrators of the source code, the static security analysis application can then generate the one or more path rules from the rules repository provided by the static security analysis application.

In some examples, additional data and/or metadata about the vulnerabilities can be provided as a result of the scanning when the representation of the source code is scanned 102. Such data and/or metadata can be used to generate the one or more patch rules 104 by, for example, indicating the type of the vulnerability, indicating the severity of the vulnerability, determining the priority for addressing the vulnerability, using pre-existing patches verses analysis application provided patches, determining a position within the source code representation where a patch can be best applied to address the vulnerability, providing suggestions for additional values in the security patch rule, or to address other such factors that can be used to generate the one or more patch rules 104. For example, as a result of a scan of the source code representation, a plurality of security vulnerabilities can be identified. Each security vulnerability can have an associated security patch rule that can specify a plurality of possible patches that can be used to address the security vulnerability. The plurality of possible patches can be from the rules repository provided by the owners or administrators of the source code or from the rules repository provided by the static security analysis application. The data and/or metadata associated with the vulnerabilities can determine, for example, the most effective location within the source code representation to apply the security patch rule. The scope and content of the one or more security patch rules is described in more detail below.

After the security patch rules are generated, the generated security patch rules can be applied 106 to the source code representation. As described above, a security patch rule can include a plurality of possible patches to the source code representation and one or more of the plurality of possible patches can be applied to the source code representation to produce one or more partially or fully patched source code representations. Each of the one or more partially or fully patched source code representations can then be provided along with the generated security patch rules so that the security patch rules can be verified and updated 108. The one or more partially or fully patched source code representations can be provided with the generated security patch rules to illustrate the results of applying the security patch rules to the source code representation.

When the security patch rules are verified and updated 108, the security patch rules can have missing additional values provided, can have one or more of a plurality of suggested solutions selected, can have locations to apply a patch determined, or can have other verification and update operations performed. For example, a security patch rule can be generated and applied that can have two different suggested solutions to address the vulnerability, each solution of which can have one or more missing additional values, and with two different possible locations to apply each of the suggested solutions. The security patch rule can include four possible solution choices (i.e., each of the two possible solutions in each of the two possible locations) with missing additional values for each. The process where the security patch rules are verified and updates 108 can perform operations to select one or the four possible solution choices and provide the missing additional values for the chosen solution, as described above.

After the security patch rules are verified and updated 108, the security patch rule can be used to patch the source code representation by applying the updated security patch rule 110. The updated security patch rules can be from the rules repository provided by the owners or administrators of the source code or from the rules repository provided by the static security analysis application The patched source code representation can then be integrated with the rest of the source code by, for example, committing the code 112 to a source code repository before the next scan of the source code to find additional vulnerabilities. As described above, there can be additional testing and/or verification operations in the workflow 100 described in FIG. 1 including, but not limited to, additional security subject matter expert verification, additional end-user or customer verification, unit testing, regression testing, black box testing, static analysis, or dynamic testing. Such additional testing and/or verification operations can be automated, can be manually performed, or can be performed using a combination of these and/or other techniques.

Figure 2:
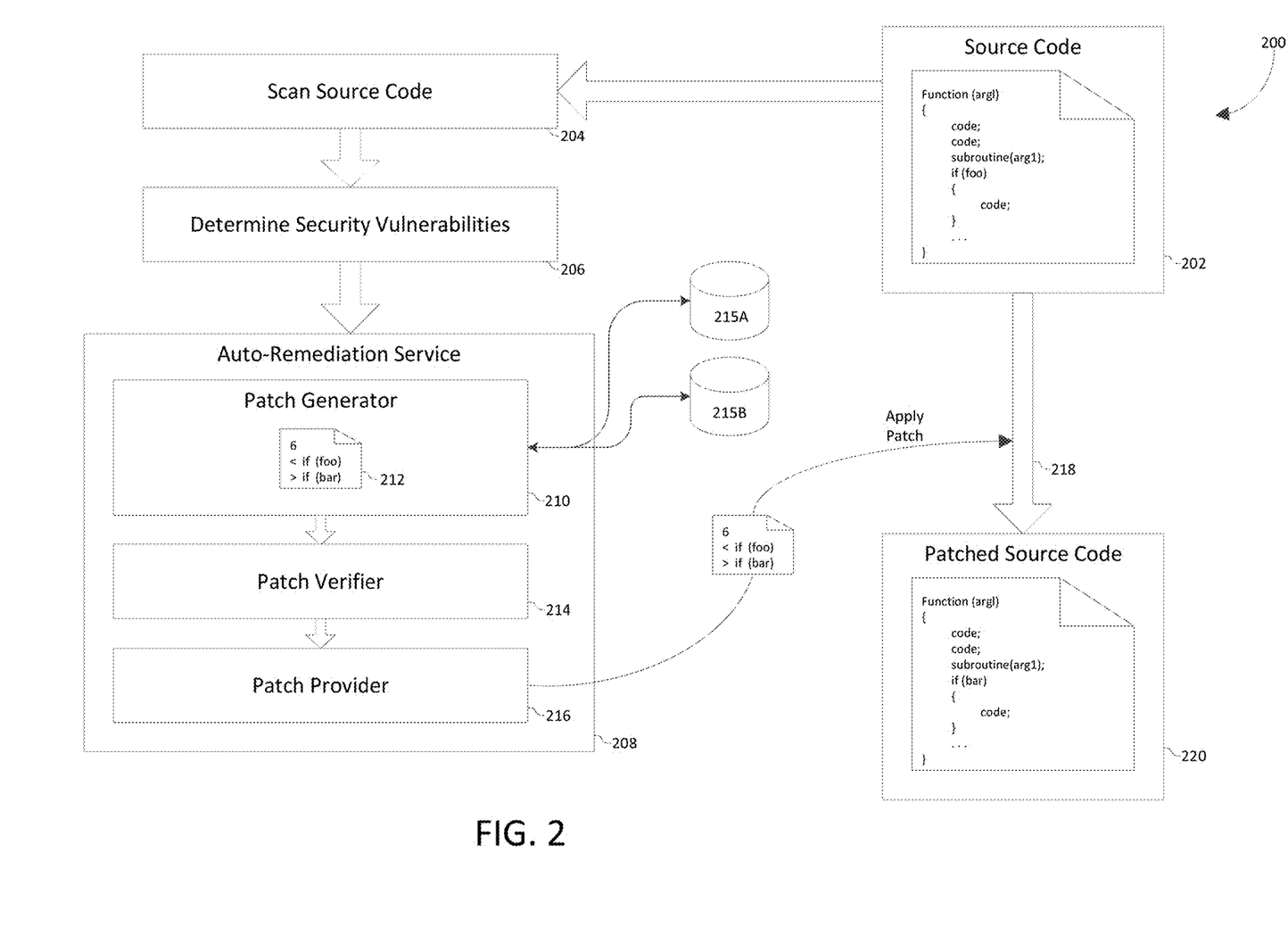
FIG. 2 illustrates an example environment for performing auto-remediation on computer system security vulnerabilities in source code in accordance with an example.

FIG. 2 illustrates an environment 200 for performing auto-remediation on computer system security vulnerabilities in source code as described herein in connection with FIG. 1 and in accordance with an example. A source code representation 202 can be scanned 204 by a source code scanner to determine security vulnerabilities 206. The source code scanner can also determine one or more APIs, classes, libraries that are used in the source code. For example, the source code scanner can determine an API was used to fix a vulnerability. The API can be determined and stored for use in future remediation of vulnerabilities found the source code. The security vulnerabilities 206 can then be provided to a process such as the auto-remediation service 208, which can be configured to generate a patch to the source code representation based at least in part on the security vulnerabilities 206. The process to scan the source code representation can be performed by an external process such as, for example, a process associated with a static analysis service. The process to scan the source code representation can also be performed by the auto-remediation service or by a process associated with the auto-remediation service 208. Similarly, the process to determine security vulnerabilities 206 can be performed by an external process such as, for example, a process associated with static analysis, by the auto-remediation service 208, or by a process associated with the auto-remediation service 208.

The auto-remediation service 208 can then use the security vulnerabilities 206 so that a patch generator 210 can generate a patch 212 to remediate one or more of the security vulnerabilities 206. The patch generator 210 can communicate (via auto-remediation service 208) with rules repositories 215A and/or 215B to generate patch 212. Rules repository 215A can include records of patch rules provided by the owners or administrators of the source code (e.g., currently or at one time utilized in the source code. Records of the APIs, classes, libraries, etc. can be stored in rules repository 215A. The records can include data needed to utilize (e.g., call, etc.) these APIs, classes, libraries, etc. in other portions of the source code. The records can also include metadata (e.g., identifiers, developer, use instructions, vulnerabilities fixed, column and line of prior use, etc.) and related APIs, classes, libraries, etc. (e.g., APIs, classes, libraries, etc. included in the same development kit, but not utilized in the source code, etc.). During remediation of the source code and/or representation, the patch generator can determine, first, whether remediation can be performed on a vulnerability using the APIs, classes, libraries, etc. sotred in local rules repository. For example, the patch generator can utilize the deteremined APIs, classes, libraries, etc. during the scan and determined based on the records associated with those determined APIs, classes, libraries, etc. whether they can be utilized to remediate the vulnerability.

Rules repository 215B can include records of patch rules provided by the entity or application performing the auto-remediation (e.g., not currently used in the source code, etc.). For example, the rule repositories (e.g., 215A, 215B) can include a plurality of APIs, libraries, classes, etc. that can be utilized by generate patch 212 to remedy security vulnerabilities 206. In some examples, there can be overlap between the APIs, libraries, classes, etc. in the repositories (e.g., 215A, 215B). The repositories (e.g., 215A, 215B) can also include metadata regarding the rules (e.g., vulnerabilities fixed, how to apply, etc.). In some examples, patch generator 210 can first communicate with rules repository 215A to determine if a patch 212 can be generated for the available resources of the repository. Rule repository 215A can include code that is at least in part utilized in the source code. For example, APIs can include a plurality of libraries or classes. The source code can have previously utilized, for a variety of reasons outside vulnerability fixes, one or more of libraries or classes of the plurality. By first attempting to utilize resources (e.g., libraries, classes, etc.) available at rules repository 215A, the source code can be more consistent and efficient (e.g., when codebases in the repository are updated, the updates across utilized resources in the source code can be updated consistently). If patch 212 cannot be generated by using rules repository 215A, patch generator 210 can communicate with rules repository 215B for generating patch 210.

The generated patch 212 can then be verified by a patch verifier 214. The generated patch 212 can then be provided by a patch provider 216 to one or more consumers such as, for example, a utility process configured to receive the patch and use the information specified therein to patch the source code. In some examples, the auto-remediation service 208 and/or a process associated with the auto-remediation service 208 can apply the patch 218 to the source code representation 202 to produce patched source code 220. In other examples, the auto-remediation service 208 can provide the path 212 to the administrator for apply the patch 218 to the source code representation 202 to produce patched source code 220.

Figure 3:
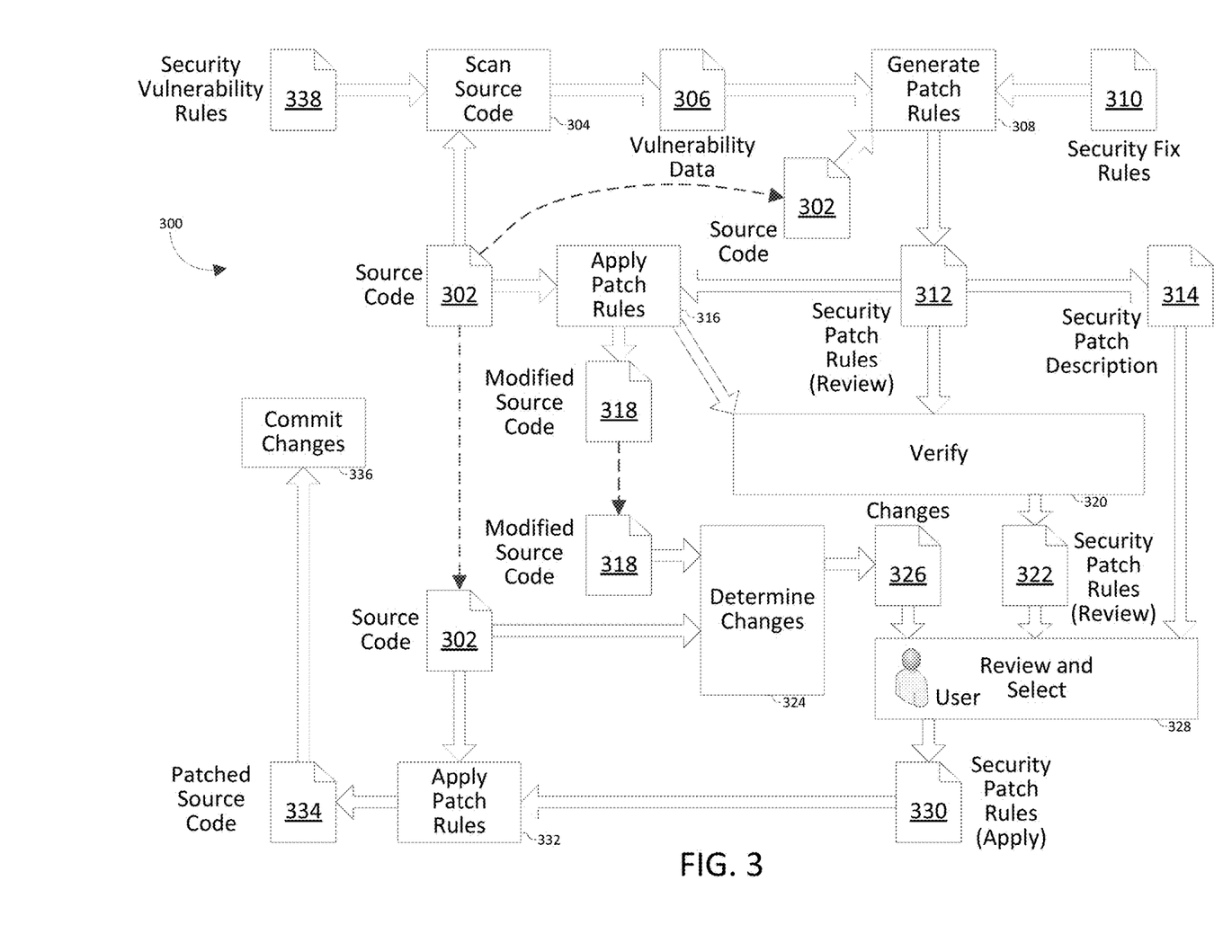
FIG. 3 illustrates an example data flow diagram for performing auto-remediation on computer system security vulnerabilities in source code in accordance with an example.

FIG. 3 illustrates a data flow diagram 300 for performing auto-remediation on computer system security vulnerabilities in source code as described herein in connection with FIG. 1 and in accordance with an example. A source code representation 302 of a subset of the set of source code associated with a computer system can be scanned 304 to produce vulnerability data 306 as described above. The vulnerability data 306 can include data associated with the vulnerability including, but not limited to, the location, severity, and impact of the vulnerability if it is not remediated. The vulnerability data 306 can also include metadata associated with the vulnerability including, but not limited to, the basis for identifying the vulnerability or details about how the vulnerability can impact the source code representation. For example, the vulnerability data 306 can include position data and/or metadata that can be used to determine a location within the source code representation where the source code can be most vulnerable or that can be used to determine a location within the source code representation where a security patch can be most effectively applied to remediate the vulnerability. These operations, to be performed efficiently, can be performed by a computer.

In some examples, the data and/or metadata associated with the vulnerability can be determined by applying one or more security vulnerability rules 338. Security vulnerability rules 338 can include rules authored by a security subject matter expert and/or can include rules based on specific domain knowledge. Security vulnerability rules 338 can also include one or more security vulnerability criteria that can be used to determine whether a security vulnerability exists. For example, in some programming languages it can be a potential vulnerability to have an assignment operator (a single equals sign) inside a conditional test rather than a compare operation (a double equals sign). A security vulnerability rule can enable detecting such vulnerabilities by searching for conditional statements in a source code representation with single equals signs within the condition. The security vulnerability criteria can include the criteria to identify conditional statements in the source code representation and can also include the criteria to distinguish assignment operations from compare operations. As different computer system languages can have different types of conditional statements and/or different operators, the security vulnerability criteria can also include language specific criteria. In some examples, the security vulnerability rules can be authored by security subject matter experts. In some examples, the security vulnerability rules can also be determined by experimentation such as, for example, by simulating the execution of source code. Such security vulnerability rules can be stored in a security vulnerability rules table that is configured to allow an auto-remediation service to selectively apply the rules to a source code representation and use the results of the rules to identify security vulnerabilities.

The vulnerability data 306 combined with one or more security fix rules 310 by an auto-remediation service to select and/or generate patch rules 308. In an example, the source code representation 302 can also be combined with the vulnerability data 306 and the one or more security fix rules 310 to select and/or generate patch rules 308. The patch rules can be selected and/or generated by a patch generator such as the patch generator 210 described in connection with FIG. 2. The security patch rules can first be selected and/or generated in review phase 312, for example, during the scan of the representation of the application source code the APIs, libraries, classes, etc. used in the application source code can be identified and stored (e.g., by the source code scanner). For example, an API that fixes one or more vulnerabilities could currently be used in the application source code (i.e., before the scan). That API can be identified and stored (e.g., in the patch rules) for use in other vulnerabilities identified in the scan of the application source code. The API can be identified in several manners, including but not limited to author, company, family, publishers, or the like. In some examples, in identifying the API, for example, by a company or family, other APIs associated with the identified API can also be available for use in patching vulnerabilities (e.g., other APIs, classes, libraries, etc. in the development kit containing the identified API). In an example, the scan can indentify an API that is marked (e.g., via metadata) for preventing SQL injection. That API can be stored as preventing SQL injection. If during the scan a vulenability is found that is a SQL injection. In response, the remediation can use the identified API for preventing the SQL injection (e.g., the same API that was previously used). The security patch rules in review phase 312 can be generated with a security patch description 314. The security patch description 314 can be a description of the security patch rules and can also include a description of any additional parameters that are required to complete the security patch rule.

For example, the security patch description 314 can include a title, a brief description of the security patch, a consideration, and/or intrusiveness information. The consideration can be a measure of how different systems and/or subsystems can be affected by the security patch. The consideration can include one or more metrics indicating how the different systems and/or subsystems can be affected by the security patch. The intrusiveness information can be a scale (e.g., "low," "medium," and "high") indicating the amount of changes in the security patch. The security patch information can be configured to allow an end-user and/or a security subject-matter expert to make an informed decision about whether to accept the auto-remediation suggestion specified by the security patch rules. In some examples, the security patch description 314 can be included with the security patch rule in review phase 312. In some examples, the security patch description 314 can be separate from the security patch rule in review phase 312.

The security patch rules in review phase 312 can then be verified 320 to ensure, for example, that the security patch rules in review phase 312 were properly selected and/or generated and additionally to ensure that the security patch rules in review phase 312 can provide remediation for the security vulnerabilities identified in the vulnerability data 306. The security patch rules in review phase 312 can be verified 320 by a patch verifier such as the patch verifier 214 described in connection with FIG. 2 and/or can be verified by a subject-matter expert such as, for example, a security engineer. In the example illustrated in FIG. 3, the security patch rules in review phase 312 can be verified 320 by a patch verifier. In some examples, the security patch rules in review phase 312 can be verified 320 by a security subject matter expert, or by the administrator, by an end-user, or by some other such person. In some examples, the security patch rules in review phase 312 can be verified 320 by an automated process such as, for example, by an expert system associated with the auto-remediation service. In some examples, the security patch rules in review phase 312 can be verified 320 by a combination of persons and processes and/or can also be verified a plurality of times by different persons or processes. In some examples, the security patch rules in review phase 312 can be applied 316 to the source code representation 302 by, for example, a security patch applicator to produce a set of modified source code representations 318. Each of the modified source code representations 318 can be generated by applying one or more of the security patch rules in review phase 312 to the source code representation 302. The modified source code representations 318 can be used in combination with the security patch rules in review phase 312 when the security patch rules in review phase 312 are verified 320 to, for example, illustrate the effects of applying each of the security patch rules in review phase 312 to the source code representation 302.

The verified security patch rules in review phase 322 can then be provided for review and selection 328 to produce the security patch rules in apply phase 330 as described herein. In the example illustrated in FIG. 3, the verified security patch rules in review phase 322 can be provided to a user (e.g., an end user) for review and selection 328. In some examples, the verified security patch rules in review phase 322 can also be provided to a security subject matter expert, or to a system administrator, or to an automated process (e.g., an expert system), or to a combination of these and/or other such entities for review and selection 328. The security patch description 314 can also be provided to aid in the review and selection and, in some examples, a set of changes 326 can also be provided. The set of changes 326 can be produced by the auto-remediation service by comparing the source code representation 302 to one or more of the set of modified source code representations 318 to determine the changes 324 suggested by each of the security patch rules in review phase 312.

The security patch rules in apply phase 330 can then be applied 332 to the source code representation 302 by a security patch applicator to produce the patched source code 334. In some examples, the security patch rules in apply phase 330 can undergo one or more additional verification steps before they are applied 332 to the source code representation 302 by the security patch applicator. In some examples, the patched source code 334 can also undergo one or more additional verification steps such as, for example, unit testing, regression testing, black box testing, or other such testing, before the patched source code is committed 336 to a source code repository for integration with the set of source code associated with the computer system.

Figure 4:
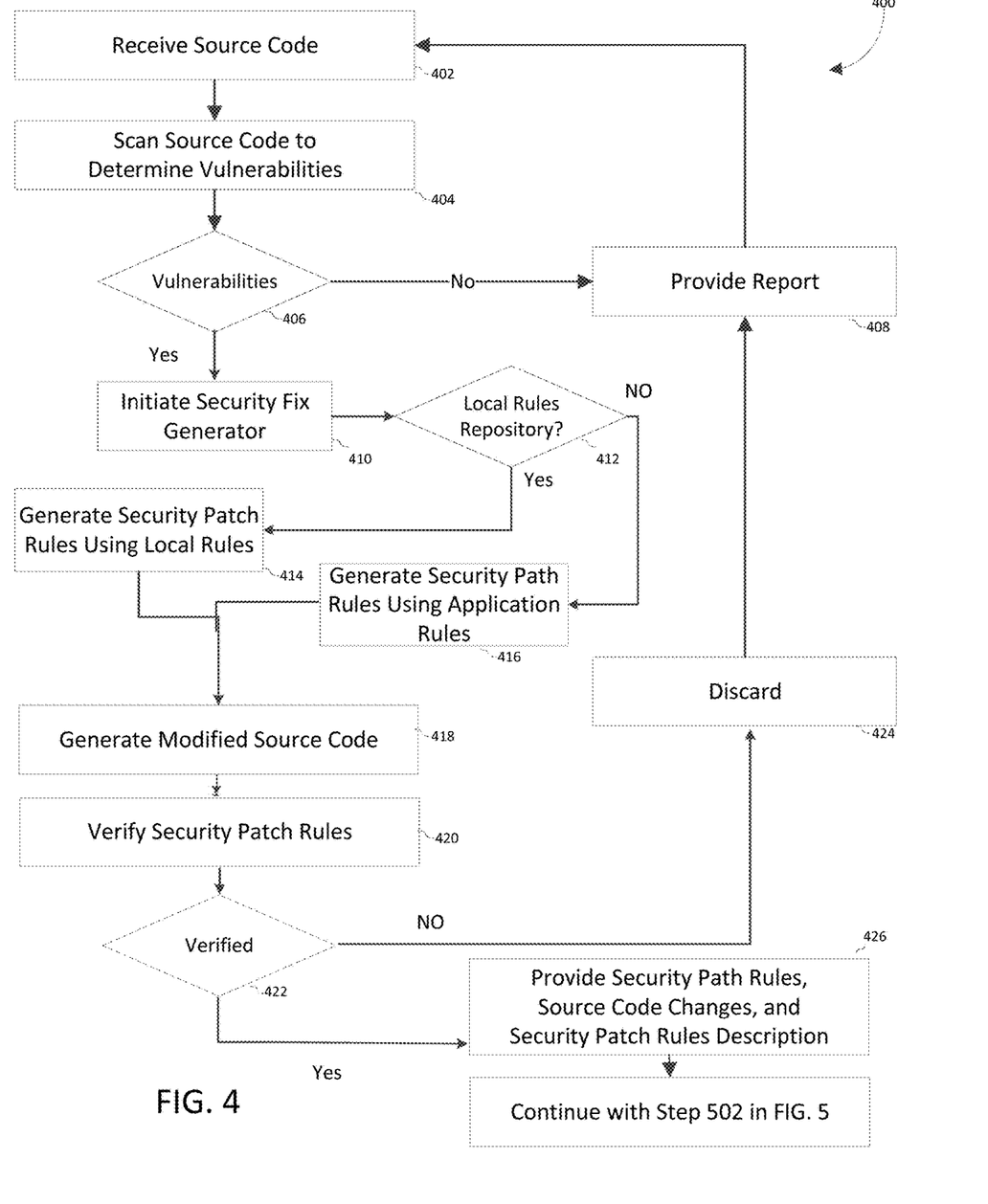
FIGS. 4 and 5 illustrate an example process for performing auto-remediation on computer system security vulnerabilities in source code in accordance with an example.
Figure 5:
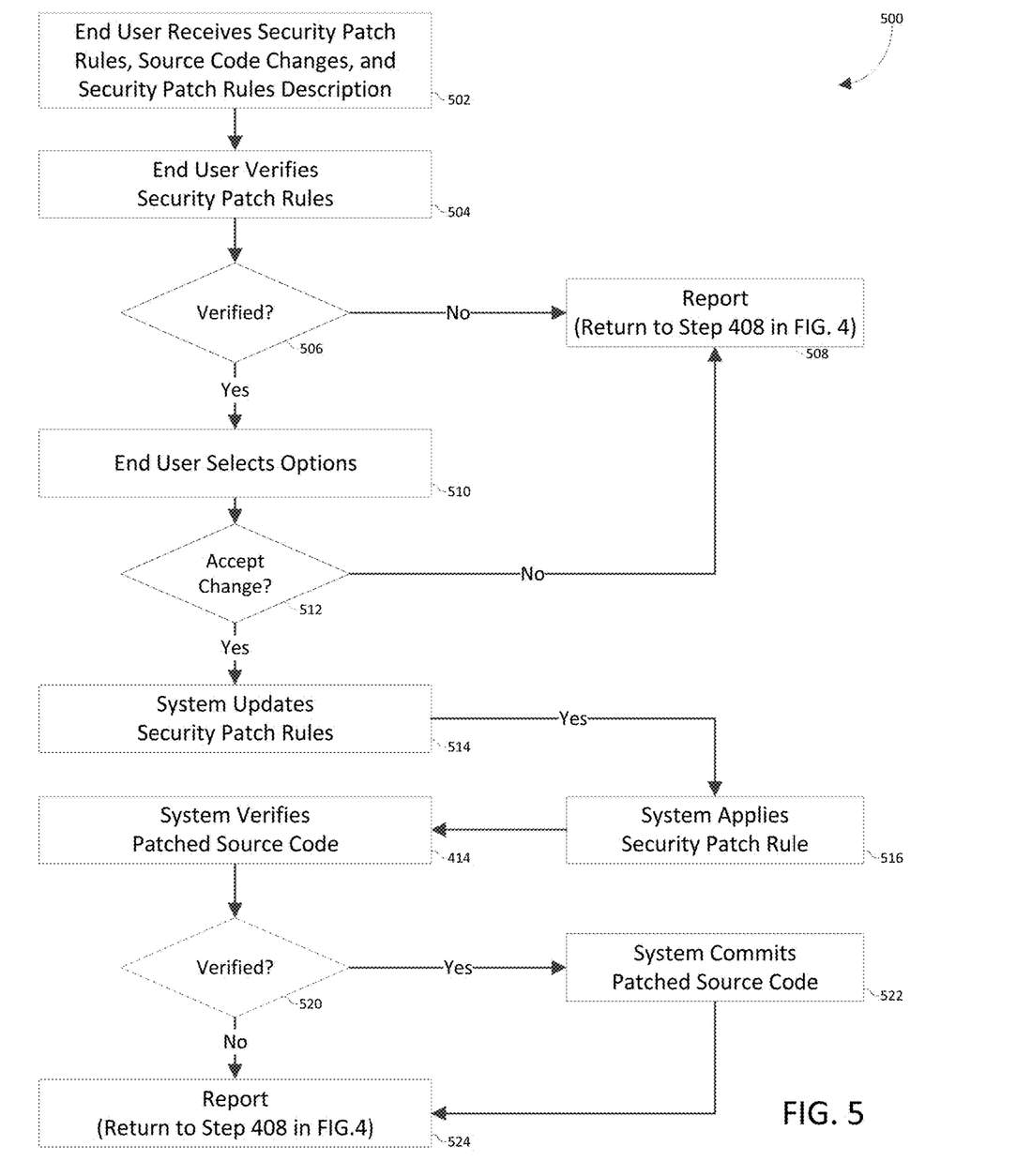

FIGS. 4 and 5 illustrate a process for performing auto-remediation on computer system security vulnerabilities in source code as described herein in connection with FIG. 1 and in accordance with an example. FIG. 4 illustrates a first part 400 of the process for performing auto-remediation on computer system security vulnerabilities in source code where security patch rules in review phase are generated along with a description of the changes and additional value (or optional parameters) associated with the security patch rules. FIG. 5 illustrates a second part 500 of the process for performing auto-remediation on computer system security vulnerabilities in source code where the security patch rules are verified, a solution is chosen, and additional values are established. An auto-remediation service such as the auto-remediation service 208 described herein in connection with FIG. 2 and/or one or more processes associated therewith can perform the process illustrated in FIGS. 4 and 5. In the second part 500 of the example process illustrated in FIGS. 4 and 5, steps 502 through 512 can be performed by an end user and/or can be performed by a process such as, for example, an expert system as described herein.

Beginning in FIG. 4, the source code can be received 402 and scanned for vulnerabilities 404 as described above. The source code can be received from a source code repository, or can be provided by a customer in the form of a source code list, or can be scanned from a customer or client site. In some examples, a representation of the source code can be received. In other examples, the received source code can be transformed into a representation of the source code, the representation being different from the source code. If no vulnerabilities 406 are detected, the auto-remediation service can provide a report 408 to the owner of the source code. The report can be in the form of an email, a text message, a dynamically generated web page, an alarm, an alert, or some other such method of alerting the owner of the source code regarding the results of the vulnerability scan.

If one or more vulnerabilities 406 are detected, a security fix generator can be initiated 410. The security fix generator can initiate the generation and/or selection of one or more security patch rules based at least in part on the detected vulnerabilities. Subsequent the initiation, the security fix generator can determine if a local rules repository exists 412 (e.g., repository 215A). For example, the owner or administrator of the source code can maintain a rules repository (e.g., 215A). The rules repository can include a plurality of APIs, libraries, classes, etc. that are at least partially, actively utilized in the source code. When a local rules repository exists (e.g., 215A), the security generator can generate security path rules 414, utilizing APIs (or the like) stored in the local rules repository, when the APIs (or the like) are capable of remediating the one or more vulnerabilities. When the local rules repository does not exist (or does not include rules capable for remediating the one or more vulnerabilities), the security generator can generate security path rules 416 utilizing a rules repository (e.g., 215B) provided by the static analysis application. The security patch rules (e.g., 414, 416) generated by the security fix generator can be in review mode (also referred to herein as in "review phase") as described above. A security patch applicator can then generate modified source code 418 by applying the one or more security patch rules in review mode to the source code (and/or representation) to produce a set of candidate modified source code. In some examples, the modified source code 418 can include metadata including column and line numbers of where the one or more security patch rules (e.g., API) should be inserted into the source code. The one or more security patch rules can then be verified 420 by a security patch rule verification process and/or by a security subject matter expert. For example, the verification can verify the security patch rule will remedy the vulnerability. Those security patch rules that are not verified 422 can be discarded 424 and a report 408 indicating the unverified security patch rules can be generated. Those security patch rules that are verified 422 can then be provided for further processing 426 along with source code changes, descriptions of the security patches, and/or other such information associated with the security patch rules as described herein in connection with FIG. 3.

Continuing with FIG. 5, an end user (or a process) can first receive 502 the security patch rules and the source code changes, descriptions of the security patches, and/or other such information including metadata (e.g., location of vulnerability fixes (column, line), vulnerability fix implemented, etc.) associated with the security patch rules provided for further processing 426 (from FIG. 4). The end user (or a process) can first verify the security patch rules 504 and, if not verified a report 508 indicating the unverified security patch rules can be generated. In some examples, the end user can use a selection tool such as a web page interface to verify and/or not verify the security patch rules and, as a result of not verifying a security patch rule, the report can be provided to the auto-remediation service. In some examples, a process (such as an expert system) can verify and/or not verify the security patch rules and, as a result of not verifying a security patch rule, a report can be provided to both the auto-remediation service as well as to the owner of the source code.

If the security patch rules are verified 506, the end user (or a process) can select options 510 to, for example, provide missing additional parameters and then can determine whether to accept the changes 512 specified in the security patch rules. At this point, the security patch rules can be in an apply mode (also referred to herein as "apply phase") as described below. If it is determined not to accept the changes 512, a report 508 can be generated as described above. If it is determined to accept the changes 512, the auto-remediation service can then complete any updates to the security patch rule 514 from the provided additional parameters, can apply the security patch rule 516 to the source code to produce the patched source code, and then can verify the patched source code 518. If the patched source code is verified 520, the auto-remediation service can commit the patched source code 522. If the patched source code is not verified 520, a report 524 to that effect can be generated.

Figure 6:
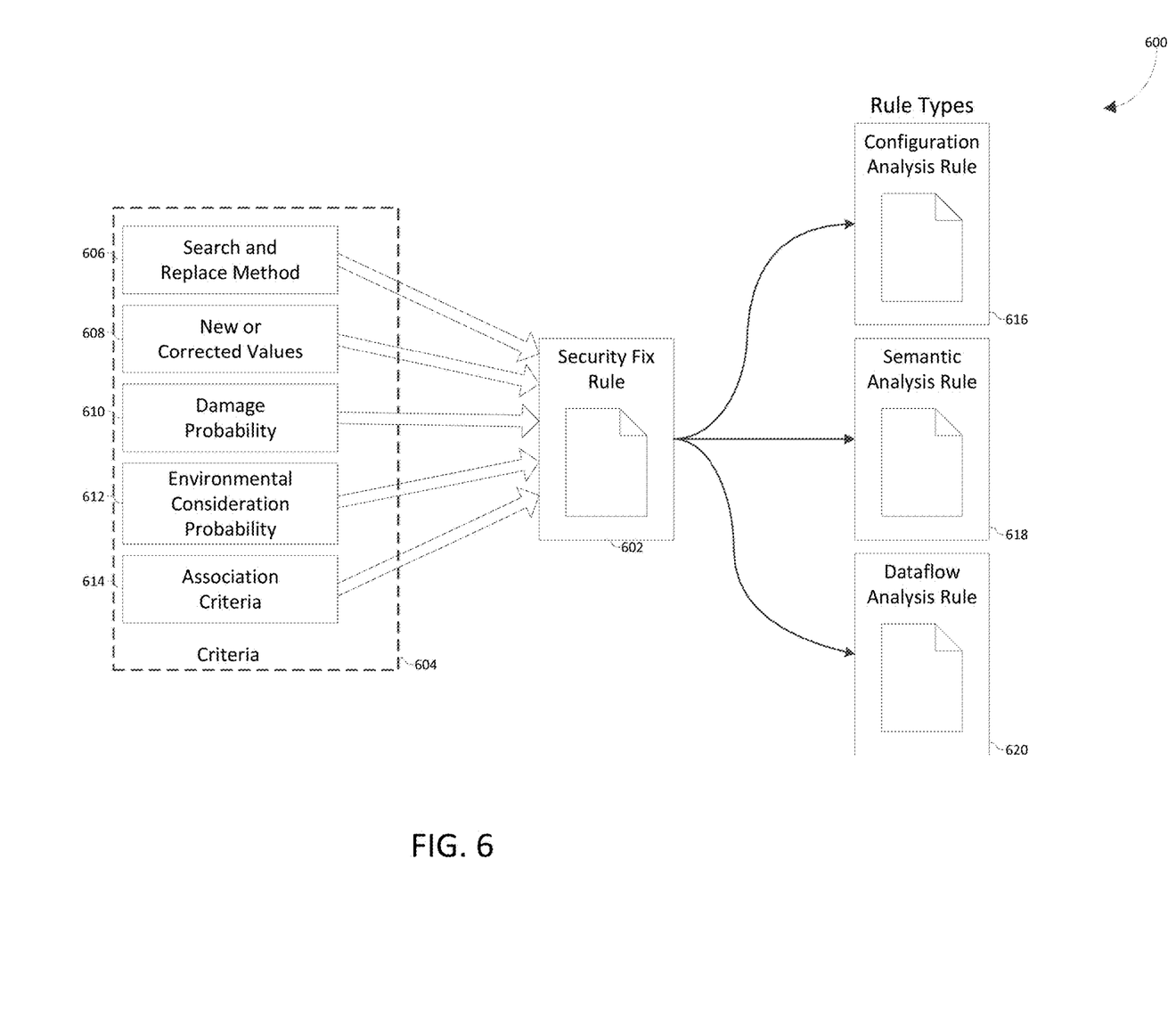
FIG. 6 illustrates an example diagram of the elements and types of a security fix rule in accordance with an example.

FIG. 6 illustrates a diagram 600 of the elements and types of a security fix rule as described herein in connection with FIG. 1 and in accordance with an embodiment. A security fix rule 602, which expresses a security fix, be based on one or more criteria 604. Because a security fix rule 602 is designed to associate a security fix to a type of security vulnerability, there be unspecified values such as, for example, the location of the vulnerability in the security fix rule 602. The criteria 604 be used to locate those unspecified values and to attempt to determine them and also be used to determine the probability that applying the security fix rule 602 cause secondary effects.

For example, the criteria 604 can include a means of expressing the search and replace method 606 for a source code representation. A search and replace method can be expressed as a combination of a search method and a replace method. A search use exact match based on, for example, line and column numbers within the source code representation. A search also use pattern matching using, for example, regular expressions. A search also be based on position analysis data where, for example, an attacker has the most control (i.e., the vulnerability be highest). A search also be based on a domain specific language that be used to perform a search within a hierarchical structure (e.g., an XML, or JSON specification) and that also be used to generate a lookup within such hierarchical structures based at least in part on the associated hierarchy. A replace use an exact replacement (i.e., specified by the rule), a replace before, a replace after, an insert, or some other such replacement. In some embodiments, the new or corrected values 608 that be used in the replacement be specified as part of the search and replace method 606. In some embodiments, the new or corrected values 608 that be used in the replacement be specified separately from the search and replace method 606.

Criteria 604 also include a damage probability 610 (i.e., an indication of the probability that the rule cause other parts of the source code representation to fail), environmental consideration probability 612 (i.e., an indication of the probability that the rule require changes to the operating environment associated with the source code representation), and/or association criteria 614 (i.e., criteria used to associate a particular vulnerability and/or class of vulnerabilities with the remediation provided by the security fix rule 602).

There be a plurality of rule types of security fix rules which be used to provide remediation to particular vulnerabilities and/or classes of vulnerabilities. A first rule type is a configuration analysis rule 616, which be a rule for addressing vulnerabilities in a configuration file that be associated with a software system. It is common practice to implement software systems (e.g., servers, operating systems, or services) with configuration files that allow customization by end-users based on the operating environment. Changing some configuration values introduce known security vulnerabilities. A configuration analysis rule 616 be authored to detect such vulnerabilities in configuration files and to remove them by adding configuration options, altering configuration options, or removing configuration options.

A second rule type is a semantic analysis rule 618, which be a rule for addressing vulnerabilities in source code related to, for example, arguments to methods, default values, or common programming errors. It is common to implement a source code library with an application programming interface (API) that expresses common function calls with one or more default arguments. Such default arguments be left unspecified by the API user, but in some environments, also introduce vulnerabilities. This be particularly true in environments with nested API calls (i.e., where the invocation of a first API call uses such default arguments to select other API calls). Similarly, an argument used in an API call that not introduce security vulnerabilities in some environments introduce security vulnerabilities in other environments. A semantic analysis rule 618 be authored to detect such vulnerabilities to remove them by specifying arguments, altering arguments, or removing arguments.

A semantic analysis rule 618 also be authored to detect common logic errors in source code representations and to remediate them, thus improving code quality. Programming languages such as Java, C, C++, and C# have overloaded the equals sign operator to allow both assignment (i.e., to assign a value to a variable) and binary comparison (i.e., to detect whether two values are equal). For example, the statement "foo=7" assigns the value seven to the variable "foo" while the statement "foo==7" checks if the value of the variable "foo" equals seven. A statement to do a binary comparison and perform some actions based on that comparison be expressed as "if (foo==7) do_actions(foo)" but the statement "if (foo=7) do_actions(foo)" (with a single equals sign) is also a valid statement in such languages. Because this second statement, while legal, is probably incorrect, a semantic analysis rule 618 be specified to remediate such a statement. However, because the source code be reliant on such an error, such a security fix rule have a high damage probability 610.

A dataflow analysis rule 620 be altered to traverse a dataflow within a source code representation and determine the most appropriate point within that dataflow to, for example, apply encryption, process output, or preprocess calls to external systems or services. An example of where such a rule be used is when a user is entering secure information such as a credit card on a web page. Before such secure information is transferred to the web service, it be encrypted and normally be encrypted using a secure connection. However, when the secure information is received at the web service, it normally be decrypted for processing. Such processing include storing the information for further use in, for example, a database. A dataflow analysis rule 620 be authored to traverse the dataflow and detect where, in the dataflow, the information is stored, and to ensure that it is encrypted before storage. As be contemplated, the types and examples of security fix rules described herein are illustrative examples and other such types and examples of security fix rules be considered as within the scope of the present disclosure.

Figure 7:
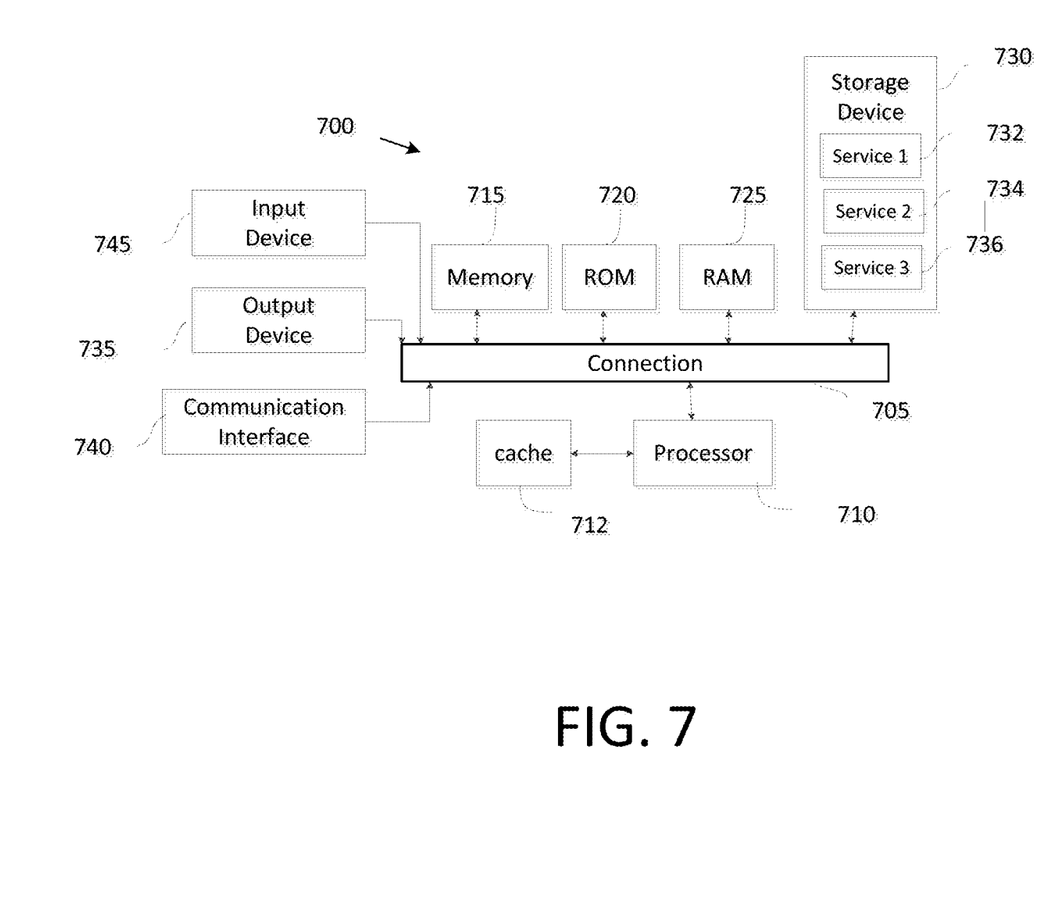
FIG. 7 shows an example of a system for implementing certain aspects of the present technology.

FIG. 7 shows an example of computing system 700 in which the components of the system are in communication with each other using connection 705. Connection 705 can be a physical connection via a bus, or a direct connection into processor 710, such as in a chipset architecture. Connection 705 can also be a virtual connection, networked connection, or logical connection.

In some examples computing system 700 is a distributed system in which the functions described in this disclosure can be distributed within a datacenter, multiple datacenters, a peer network, etc. In some examples, one or more of the described system components represents many such components each performing some or all of the function for which the component is described. In some examples, the components can be physical or virtual devices.

Example system 700 includes at least one processing unit (CPU or processor) 710 and connection 705 that couples various system components including system memory 715, such as read only memory (ROM) and random access memory (RAM) to processor 710. Computing system 700 can include a cache of high-speed memory connected directly with, in close proximity to, or integrated as part of processor 710.

Processor 710 can include any general purpose processor and a hardware service or software service, such as services 732, 734, and 736 stored in storage device 730, configured to control processor 710 as well as a special-purpose processor where software instructions are incorporated into the actual processor design. Processor 710 can essentially be a completely self-contained computing system, containing multiple cores or processors, a bus, memory controller, cache, etc. A multi-core processor can be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. There is no restriction on operating on any particular hardware arrangement and therefore the basic features here can easily be substituted for improved hardware or firmware arrangements as they are developed.

Storage device 730 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 730 can include software services, servers, services, etc., that when the code that defines such software is executed by the processor 710, it causes the system to perform a function. In some examples, a hardware service that performs a particular function can include the software component stored in a computer-readable medium in connection with the necessary hardware components, such as processor 710, connection 705, output device 735, etc., to carry out the function.

For clarity of explanation, in some instances the present technology can be presented as including individual functional blocks including functional blocks comprising devices, device components, steps or routines in a method embodied in software, or combinations of hardware and software.

Any of the steps, operations, functions, or processes described herein can be performed or implemented by a combination of hardware and software services or services, alone or in combination with other devices. In some examples, a service can be software that resides in memory of a client device and/or one or more servers of a content management system and perform one or more functions when a processor executes the software associated with the service. In some examples, a service is a program, or a collection of programs that carry out a specific function. In some examples, a service can be considered a server. The memory can be a non-transitory computer-readable medium.

In some examples the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions can be, for example, binaries, intermediate format instructions such as assembly language, firmware, or source code. Examples of computer-readable media that can be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter can have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method, the method comprising:
   receiving, at a server, results of a scan of application source code, wherein the scan of the application source code did not execute the application source code;
   determining, from the results of the scan of the application source code, without executing the application source code, one or more vulnerabilities in the application source code;
   in response to determining one or more vulnerabilities in the application source, determining a local rules repository exists;
   in response to the local rules repository existing, accessing the local rules repository storing one or more security fix rules;
   generating one or more security patch rules based at least in part on the one or more vulnerabilities and based at least in part on the one or more security fix rules stored at the local rules repository;
   verifying the one or more security patch rules;
   selecting the verified security patch rule of the one or more security patch rules to generate a security patch to remediate the one or more vulnerabilities; and
   applying the security patch to the application source code.

2. The computer-implemented method of claim 1, wherein the one or more security fix rules created from one or more application programming interfaces for use in the application source code.

3. The computer-implemented method of claim 1, further comprising:
   in response to the local rules repository not existing, generating one or more security patch rules based at least in part on the one or more vulnerabilities and based at least in part on the one or more security fix rules stored at the local rules repository.

4. The computer-implemented method of claim 1, wherein the one or more security patch rules are generated in a review mode.

5. The computer-implemented method of claim 1, further comprising: generating a modified application source code based on the one or more security patch rules.

6. The computer-implemented method of claim 1, wherein the local rules repository includes a plurality of application programming interfaces that are at least partially and actively utilized in the application source code.

7. The computer-implemented method of claim 1, wherein the local rules repository includes a plurality of libraries and classes that are at least partially and actively utilized in the application source code.

8. A non-transitory computer-readable medium storing instructions, which when executed by a processor, causes the processor to:
   receive results of a scan of application source code, wherein the scan of the application did not execute the application source code;
   determine, from the results of the scan of the application source code, without executing the application source code, for one or more vulnerabilities in the application source code;
   in response to determining one or more vulnerabilities in the application source, determine a local rules repository exists;

in response to the local rules repository existing, access the local rules repository storing one or more security fix rules;

generate one or more security patch rules based at least in part on the one or more vulnerabilities and based at least in part on the one or more security fix rules stored at the local rules repository;

verify the one or more security patch rules;

select the verified security patch rule of the one or more security patch rules to generate a security patch to remediate the one or more vulnerabilities; and apply the security patch to the application source code.

9. The non-transitory computer-readable medium of claim 8, wherein the one or more security fix rules created from one or more application programming interfaces for use in the application source code.

10. The non-transitory computer-readable medium of claim 8, comprising further instructions which when executed by the processor, causes the processor to:

in response to the local rules repository not existing, generate one or more security patch rules based at least in part on the one or more vulnerabilities and based at least in part on the one or more security fix rules stored at the local rules repository.

11. The non-transitory computer-readable medium of claim 8, wherein the one or more security patch rules are generated in a review mode.

12. The non-transitory computer-readable medium of claim 8, comprising further instructions which when executed by the processor, causes the processor to:

generating a modified application source code based on the one or more security patch rules.

13. The non-transitory computer-readable medium of claim 8, wherein the local rules repository includes a plurality of application programming interfaces that are at least partially and actively utilized in the application source code.

14. The non-transitory computer-readable medium of claim 8, wherein the local rules repository includes a plurality of libraries and classes that are at least partially and actively utilized in the application source code.

15. A server comprising:

a processor;

a memory storing instructions, which when executed by the processor, causes the processor to:

receive results of a scan of application source code, wherein the scan of the application did not execute the application source code;

determine, from the results of the scan of the application source code, without executing the application source code, one or more vulnerabilities in the application source code;

in response to determining one or more vulnerabilities in the application source, determine a local rules repository exists;

in response to the local rules repository existing, access the local rules repository storing one or more security fix rules;

generate one or more security patch rules based at least in part on the one or more vulnerabilities and based at least in part on the one or more security fix rules stored at the local rules repository;

verify the one or more security patch rules;

select the verified security patch rule of the one or more security patch rules to generate a security patch to remediate the one or more vulnerabilities; and apply the security patch to the application source code.

16. The server of claim 15, wherein the one or more security fix rules created from one or more application programming interfaces for use in the application source code.

17. The server of claim 15, comprising further instructions which when executed by the processor, causes the processor to:

in response to the local rules repository not existing, generate one or more security patch rules based at least in part on the one or more vulnerabilities and based at least in part on the one or more security fix rules stored at the local rules repository.

18. The server of claim 15, wherein the one or more security patch rules are generated in a review mode.

19. The server of claim 15, wherein the local rules repository includes a plurality of application programming interfaces that are at least partially and actively utilized in the application source code.

20. The server of claim 15 wherein the local rules repository includes a plurality of libraries and classes that are at least partially and actively utilized in the application source code.

* * * * *